United States Patent [19]

Russo

[11] 3,962,634

[45] June 8, 1976

[54] AUTOMATIC DELAY COMPENSATOR

[75] Inventor: Anthony L. Russo, Lanham, Md.

[73] Assignee: The United States of America as represented by the Secretary of the Army, Washington, D.C.

[22] Filed: Aug. 6, 1973

[21] Appl. No.: 385,938

[52] U.S. Cl. .................................. 325/6; 325/58; 179/15 BS; 178/69.5 DC
[51] Int. Cl.² .............................................. H04B 7/20
[58] Field of Search ............... 343/100 ST; 325/4, 6, 325/15, 58, 63; 179/15 BS, 69.5 R, 69.5 DC

[56] References Cited
UNITED STATES PATENTS

| | | | |
|---|---|---|---|
| 3,042,751 | 7/1962 | Graham | 179/15 R |
| 3,085,200 | 4/1963 | Goodall | 179/15 BS |
| 3,188,569 | 1/1965 | Mahony | 179/15 BS |
| 3,195,048 | 7/1965 | Adams et al. | 325/56 |
| 3,306,978 | 2/1967 | Simmons et al. | 179/15 BS |
| 3,320,611 | 5/1967 | Sekimoto et al. | 325/4 X |
| 3,418,579 | 12/1968 | Hultberg | 325/4 X |
| 3,430,237 | 2/1969 | Allen | 325/4 X |
| 3,551,813 | 12/1970 | Kaneko | 325/4 |
| 3,611,435 | 10/1971 | Cooper | 325/4 |
| 3,641,274 | 2/1972 | Sasaki et al. | 179/15 BS |
| 3,721,767 | 3/1973 | LaMarche et al. | 325/4 |

FOREIGN PATENTS OR APPLICATIONS

| | | | |
|---|---|---|---|
| 1,940,958 | 5/1970 | Germany | 325/4 |

*Primary Examiner*—Robert L. Griffin
*Assistant Examiner*—Aristotelis M. Psitos
*Attorney, Agent, or Firm*—John R. Utermohle; Thomas O. Maser; Barry N. Young

[57] ABSTRACT

An apparatus for automatically maintaining constant the transmission time delay between a transmitter and receiver, given variations due to transmission path length or clock drift. A received signal is shifted a predetermined number of stages into a shift register before synchronization, and thereafter stages are added or subtracted as needed to maintain synchronization despite changes in transmission time delay.

3 Claims, 6 Drawing Figures

AUTOMATIC DELAY COMPENSATOR

BACKGROUND OF THE INVENTION

This invention relates generally to the field of data communications, and more specifically to data communications wherein the total time delay between a transmitted and received signal may vary, either because of changes in absolute distance between the transmitter and receiver or because of routing changes in the path between the transmitter and receiver.

It is commonly necessary to maintain such total time delay constant, for example, in satellite communication systems where all units are synchronized to a common station clock. Even a "synchronous" satellite, if positioned at a point above the earth not directly above the equator, will move in a figure-eight pattern with a potential maximum movement of several hundred miles. Such a deviation may cause periodic loss of synchronization, hence loss of communications, which must be continually detected and corrected. The technique previously employed to correct this problem is typified in the disclosure of U.S. Pat. No. 3,611,435 to Cooper, which was granted on Oct. 5, 1971. As described therein, a signal is transmitted from a ground terminal to a satellite and back to the ground terminal. The total round-trip delay is measured, and the transmission delay is varied to maintain constant the total time delay measured.

A primary disadvantage of this method is the requirement that the transmitted signal be retransmitted from the receiver back to the transmitter, with subsequent corrections being made at the transmitter. It would considerably reduce the time required for resynchronization if the need to retransmit the received signal back to the transmitter could be eliminated. Additionally, it would then be possible to eliminate transmitter equipment in the receiver if such equipment were otherwise unnecessary for a particular application.

SUMMARY OF THE INVENTION

It is an object of this invention to provide an apparatus for maintaining constant the transmission time delay between a transmitter and receiver given variations in distance between the transmitter and receiver.

It is a further object to provide an apparatus for maintaining constant the time delay between a transmitter and receiver, given variations in the transmission path routing length.

It is also an object to provide an apparatus for maintaining synchronization between a transmitter and receiver, given a relative drift between their respective clock patterns.

An additional object is to provide an apparatus for maintaining synchronization between a multi-channel transmitter and receiver, utilizing one channel exclusively for synchronization.

It is a still further object to maintain synchronization between a transmitter and receiver without the necessity of retransmission of the received signal back to the transmitter.

An apparatus for accomplishing these and other objects may include a transmitter capable of transmitting a multi-channel time division multiplex signal, a receiver, a signal path electrically connecting the transmitter and receiver, and a means adjacent to the receiver and interposed within the signal path, for maintaining constant the transmission time delay between the transmitter and receiver.

DESCRIPTION OF THE PREFERRED EMBODIMENT

The automatic delay compensator (ADC) described herein is an ancillary unit designed to operate with a time division multiplex (TDM) communication system such as the Bendix Model 150A. For purposes of illustration, the multiplexing of 12 channels will be presumed, but only slight modifications would be necessary to provide for more or fewer channels. The ADC requires that one channel be devoted entirely to synchronization. The selected channel must be of the lowest speed in the TDM channel breakdown to insure that the sync pattern appears only once per frame in the aggregate data stream. It should be understood that a satellite communications system is described as an example only, and that the device described herein has equal applicability in any communications system where the transmission time delay may vary, either as a result of variations in transmission path length or due to a relative drifting between the clocks of the transmitter and receiver.

Figure 1:
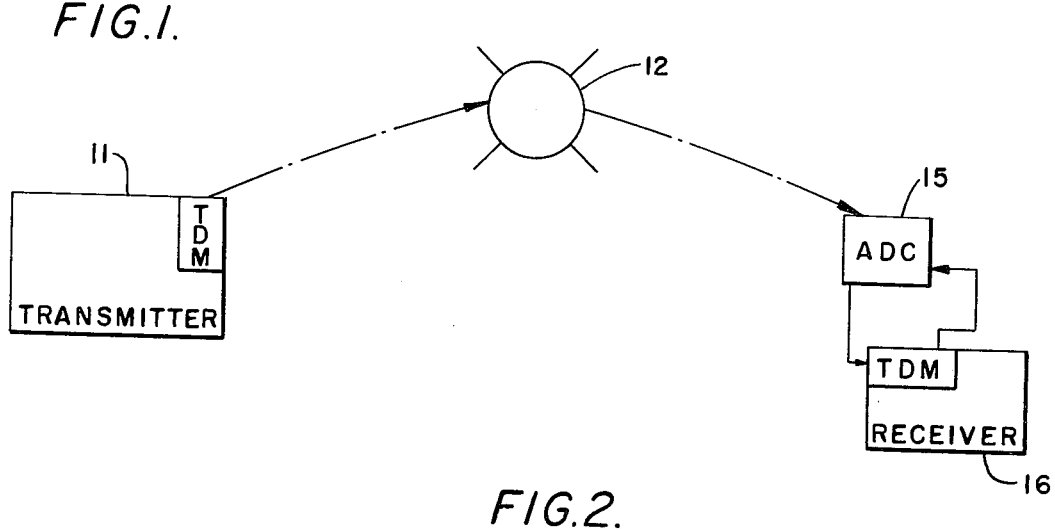
FIG. 1 is a communication circuit including the present invention.

Referring to FIG. 1, a transmitter 11 sends a TDM signal to a satellite 12, which satellite then relays the signal through an ADC 15 to a receiver 16. One channel of the TDM signal, dedicated exclusively to synchronization, contains a periodic sync pattern which may be compared with a locally generated pattern at the receiver to recognize whether or not the transmitter and receiver are synchronized. The ADC 15 initially synchronizes the received signal by first passing the signal through a predetermined number of delays and then comparing the dedicated synchronization channel pattern to an identical locally generated pattern. The comparison is continuously monitored thereafter to determine that synchronization is maintained. If synchronization is lost, either through clock drift or through variations in the path length from the transmitter through the satellite to the receiver, the ADC 15 adds or subtracts increments of delay until the synchronization is recaptured.

Figure 2:
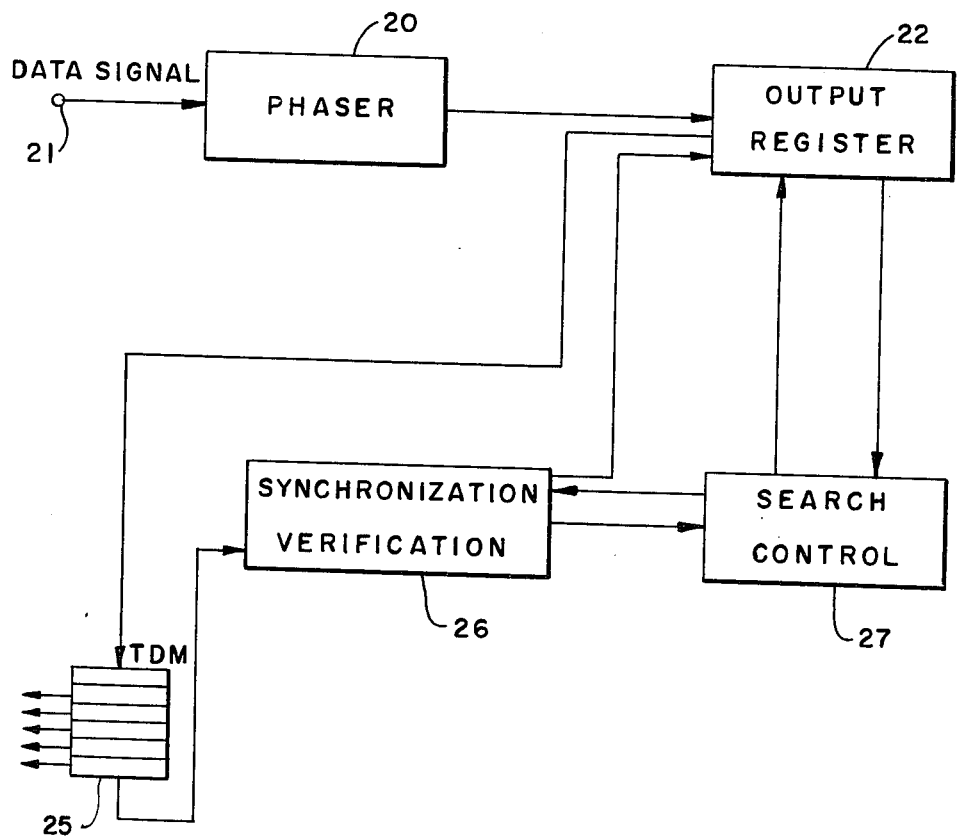
FIG. 2 is a block diagram of the present invention.

Referring to FIG. 2, the ADC consists of a phaser circuit 20 which accepts input signals on a terminal 21. The phaser circuit retimes the received data from the transmitter (modem) clock to the station clock. The retimed data is communicated to an output register circuit 22 and then to the receiver TDM unit 25. The dedicated sync channel information is sent to the synchronization verification circuit 26 which generates an identical synchronization pattern and continuously compares it to the pattern being received. As long as the received and locally generated patterns compare, the information on the data channels is in sync and available for use. A failure to compare indicates a loss of synchronization, thereby activating the search control circuit 27. This circuit automatically adds or deletes delay in the output register circuit 22 until the synchronization patterns again compare.

Figure 3:
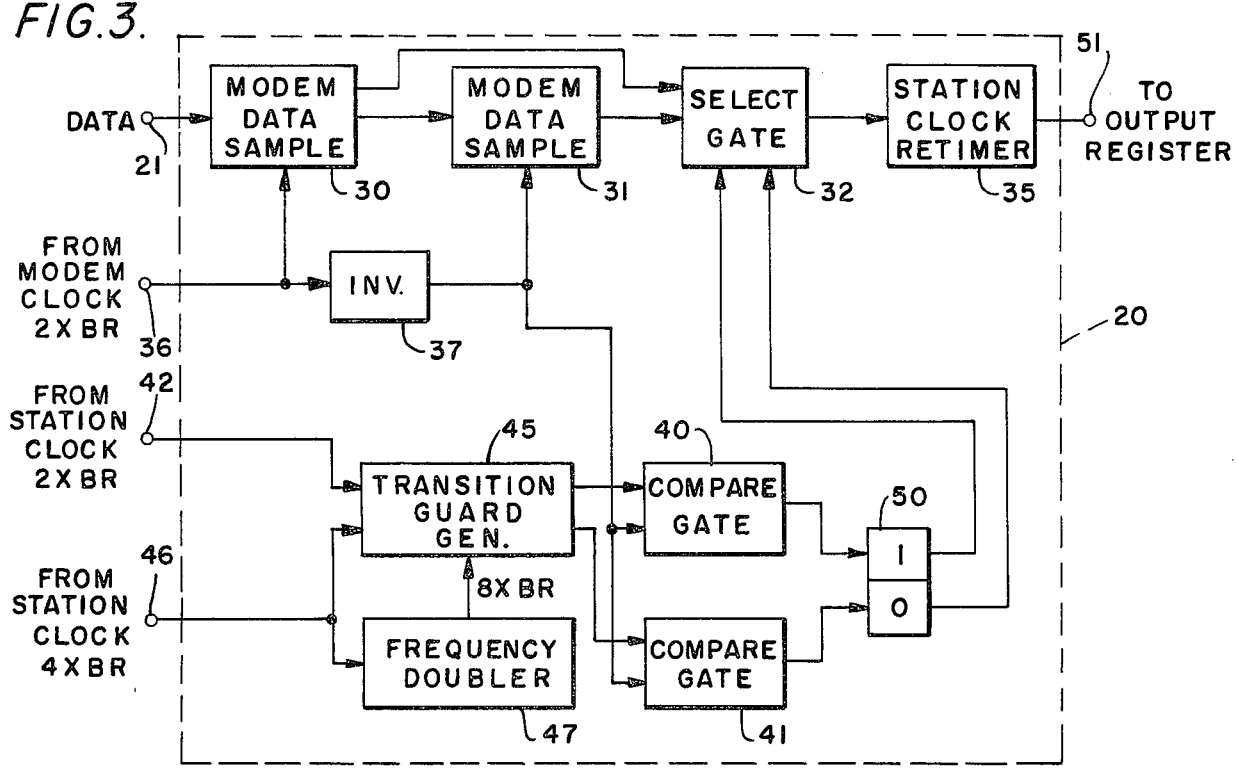
FIG. 3 is a phaser circuit included within the present invention.

Referring to FIG. 3, the phaser circuit 20 is shown in greater detail. TDM data received from the satellite is fed via terminal 21 into a first modem data sample circuit 30. This circuit is connected to a second modem data sample circuit 31 and a select gate 32, to which is also connected the second modem data sample circuit 31. The select gate 32 is connected to a station clock retimer circuit 35. Modem clock pulses, stepping at two times the input bit rate (2 × BR), are applied at terminal 36 and fed to the first modem data sample circuit 30, and through an inverter 37 to the second modem data sample circuit 31 and compare gates 40 and 41. Station clock pulses at two times the input bit rate are applied at terminal 42 and fed to a transition guard generator 45, which is electrically connected to the compare gates 40 and 41. Station clock pulses at four times the input bit rate (4 × BR) are applied at terminal 46 and connected to the transmission guard generator 45 and a frequency doubler 47, which in turn is connected to the transition guard generator 45. The compare gates 40 and 41 are connected to a flip-flop 50 whose outputs are connected to the select gate 32.

The primary purpose of the phaser circuit is to compare the modem data transitions and the station clock transitions in order to, so far as possible, maintain the correct phase relationship between the station and modem clocks. Data entering the circuit at the terminal 21 is sampled by the first modem data sample circuit 30 whenever the modem 2 × BR clock pulse on the terminal 36 makes a "+" to "−" transition. The modem 2 × BR clock pulses on the terminal 36 pass through an inverter 37, causing the second modem data sample circuit 31 to sample incoming data when the clock pulses make a "−" to "+" transition. Both of these data samples are then applied to the select gate 32 which selects that data which will most nearly be center sampled by the positive edge of station clock in the manner described herein below. The 2 × BR station clock pulses on the terminal 42 and the 4 × BR station clock pulses on the terminal 46 are applied to the transition guard generator 45, together with the station 8 × BR pulses generated by the frequency doubler 47. The transition guard generator 45 develops two pulse pedestals, or guards, which straddle the 2 × BR station clock transitions. These transition guards are approximately ¼th bit wide and are arranged ⅛th bit on each side of both negative and positive transitions. Comparisons between the modem data transitions and the station clock transition guards are made on a continual basis via compare gates 40 and 41. When the output from compare gate 40 is coincident with the modem clock 2 × BR transitions inverted by the inverter 37, the bistable flip-flop 50 is set, thereby allowing the select gate 32 to pass the data sampled by the first modem data sample circuit 30 to the station clock retimer 35. This is the phase of data which will most nearly be center sampled by the positive edge of the station clock. Similarly, when the output from compare gate 41 is coincident with the modem clock 2 × BR transitions inverted by inverter 37, the bistable flip-flop 50 is reset, thereby allowing the select gate 32 to pass the data sampled by the second modem data sample circuit 31 to the station clock retimer 35. The properly timed data is passed to the output register circuit connected to phaser circuit 20 at terminal 51. Note that the phase relationship of the station clock and the modem data may continually change due to clock drift and data path changes, thereby causing a shift in data phase with a resulting loss of synchronization. However, the automatic delay compensator will resync and re-establish the proper delay by switching the data output appropriately.

Figure 4:
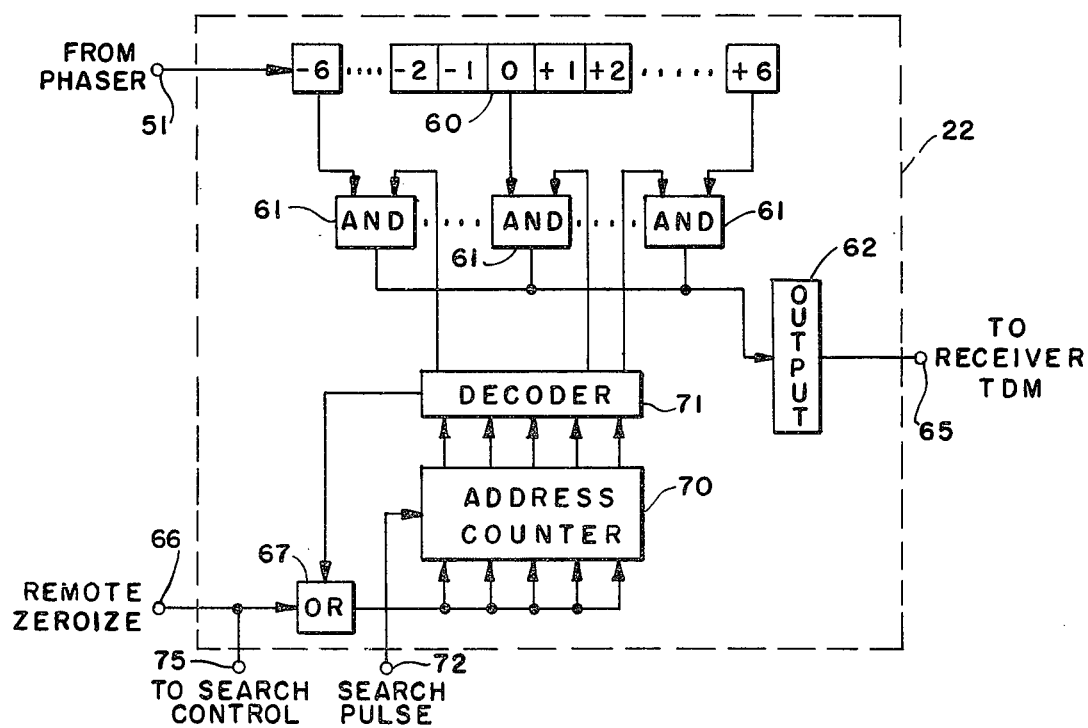
FIG. 4 is an output register circuit included within the present invention.

The output register circuit 22 (FIG. 4) consists of a shift register 60 which, for purposes of this example, contains 13 stages. These stages are connected to a series of "AND" gates 61—61, the outputs of which are connected to an output buffer 62. There is one AND gate 61 for each stage of the shift register 60. The output buffer 62 is connected to the receiver TDM via a terminal 65. Information from a remote zeroize pulse source, applied at terminal 66, is applied to an "OR" gate 67 which in turn is connected to the inputs of an address counter 70. Outputs from the address counter 70 are applied to a decoder circuit 71, the outputs of which are in turn applied to the AND gates 61—61. The decoder circuit 71 is also connected to OR gate 67. The address counter 70 is a binary counter having a maximum count at least equal to the number of stages in the shift register 60. The counter 70 increments by one whenever a pulse is applied to the terminal 72. The value in the counter 70 is communicated to the inputs of the decoder circuit 71 which, by common logic circuitry, activates one or another of the AND gates 61 according to the value in the address counter 70. Only one AND gate is activated at a time; in this embodiment, the counter value activates the AND gate connected to a particular shift register stage in the following relationship:

| Address Counter Value | Activates | Shift Register Stage |
|---|---|---|
| 0 | | 0 |
| 1 | | +1 |
| 2 | | −1 |
| 3 | | +2 |
| 4 | | −2 |
| 5 | | +3 |
| 6 | | −3 |
| 7 | | +4 |
| 8 | | −4 |
| 9 | | +5 |
| 10 | | −5 |
| 11 | | +6 |
| 12 | | −6 |
| 13 | | reset |

Data from the phaser circuit 20 is applied to the terminal 51 and shifted into the shift register 60. Initial synchronization is established with the address counter 70 preset to "0" by the operator applying a pulse to the terminal 66, the pulse being transmitted to the zeroize inputs of the address counter through the OR gate 67 which activates the AND gate connected to shift register stage 0. Data shifting into the register, upon reaching stage 0, is passed through the AND gate to the output buffer 62, from where it is passed to the receiver TDM connected at the terminal 65. As long as there is no change in the transmission path delay, this condition will remain stable. When a change does occur, a pulse from the search control circuit 27 (further described herein below), applied to a terminal 72, increments the address counter 70 by one, thereby activating the AND gate associated with the "+1" stage of the shift register 60. A one-bit delay is thus added to the total transmission path. The sync verification circuit 26 (further described herein below) determines whether sync has been regained. If so, the output register circuit 22 will remain in that condition. If sync is not regained, the sync verification circuit 26 signals the search control circuit 27 to again increment the address counter 70, the increment-and-compare cycle continuing until sync is regained. If sync is not regained upon the count in the address counter 70 reaching a count of 13, the decoder 71 sends a pulse to the OR gate 67, thereby resetting the address counter to 0 and restarting the search sequence.

Figure 5:
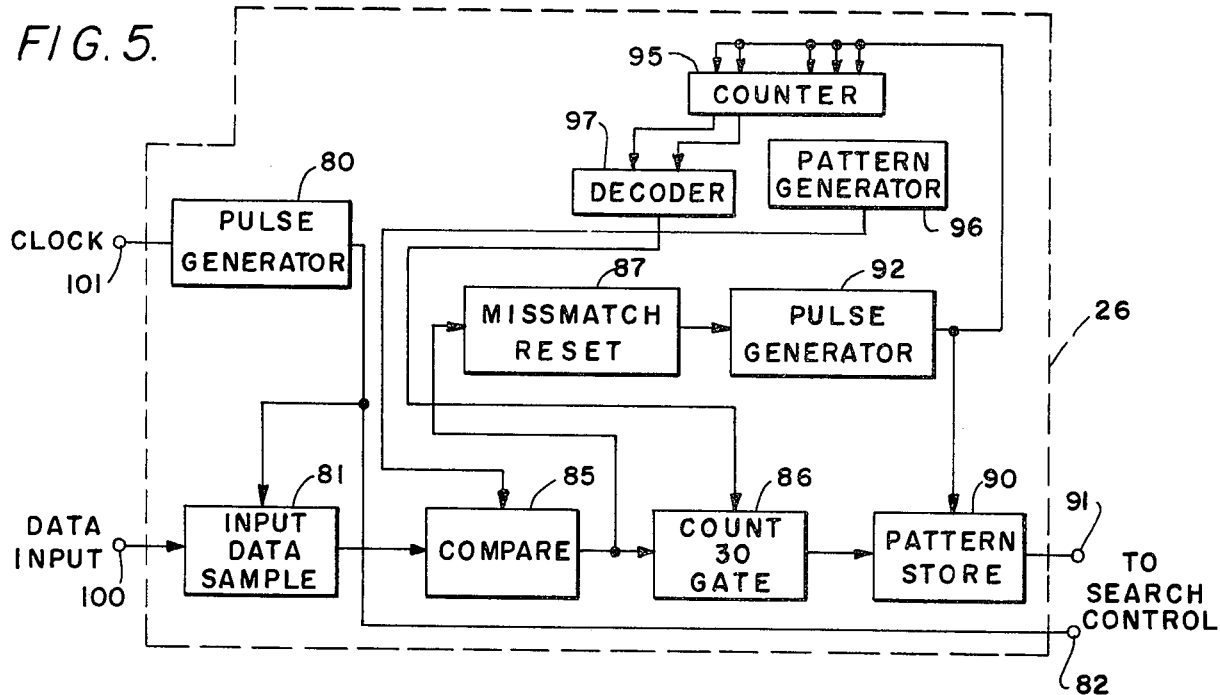
FIG. 5 is a synchronization verification circuit included within the present invention.

Referring to FIG. 5, the synchronization verification circuit 26 consists of a pulse generator 80 which is connected to an input data sample circuit 81. The output from the pulse generator 80 is also connected by terminal 82 to the search control circuit 27. The input data sample circuit 81 is connected to a compare circuit 85 which is connected to a "count 30" gate 86 and a mismatch reset circuit 87. The count 30 gate 86 is connected to a pattern store flip-flop 90 which in turn is connected to the search control circuit via a terminal 91. The mismatch reset circuit 87 is connected to a pulse generator 92. The pulse generator 92 is connected to the pattern store flip-flop 90 and a match counter 95. The counter 95 is, in turn, connected through a pattern generator 96 to the compare circuit 85, and, through a decoder 97, to the count 30 gate 86.

Synchronization is established and continuously monitored by comparing the transmitted sync pattern with an identical pattern generated by the pattern generator 96. This generator is a series of binary gates connected to the outputs of the counter 95. The gates could be connected in any number of obvious ways, at the discretion of one skilled in the art, to produce a periodic binary pattern as the counter is incremented. Data from the transmitted sync channel is applied to a terminal 100. Clock pulses applied to a terminal 101 activate the pulse generator 80 which clocks the sync channel data through the input data sample circuit 81 to the compare circuit 85. If the patterns from the input data sample circuit 85 and the pattern generator 96 compare, a logic 0 appears at the output of the compare circuit 85. If the inputs do not compare, a logic "1" appears. If the output is logic 1, the mismatch reset circuit 87 activates the pulse generator 92, which resets the counter 95 to zero. Simultaneously, the pattern store circuit 90 is set to logic 1, thereby activating the search control circuit 27 described further herein below. For purposes of this example, it is necessary that the patterns compare for 30 consecutive bits to insure sync. When the value in the counter 95 reaches 30, decoder 97 opens the count 30 gate 86 which sets the pattern store circuit 90 to logic 0, turning off the search control circuit via terminal 91.

Figure 6:
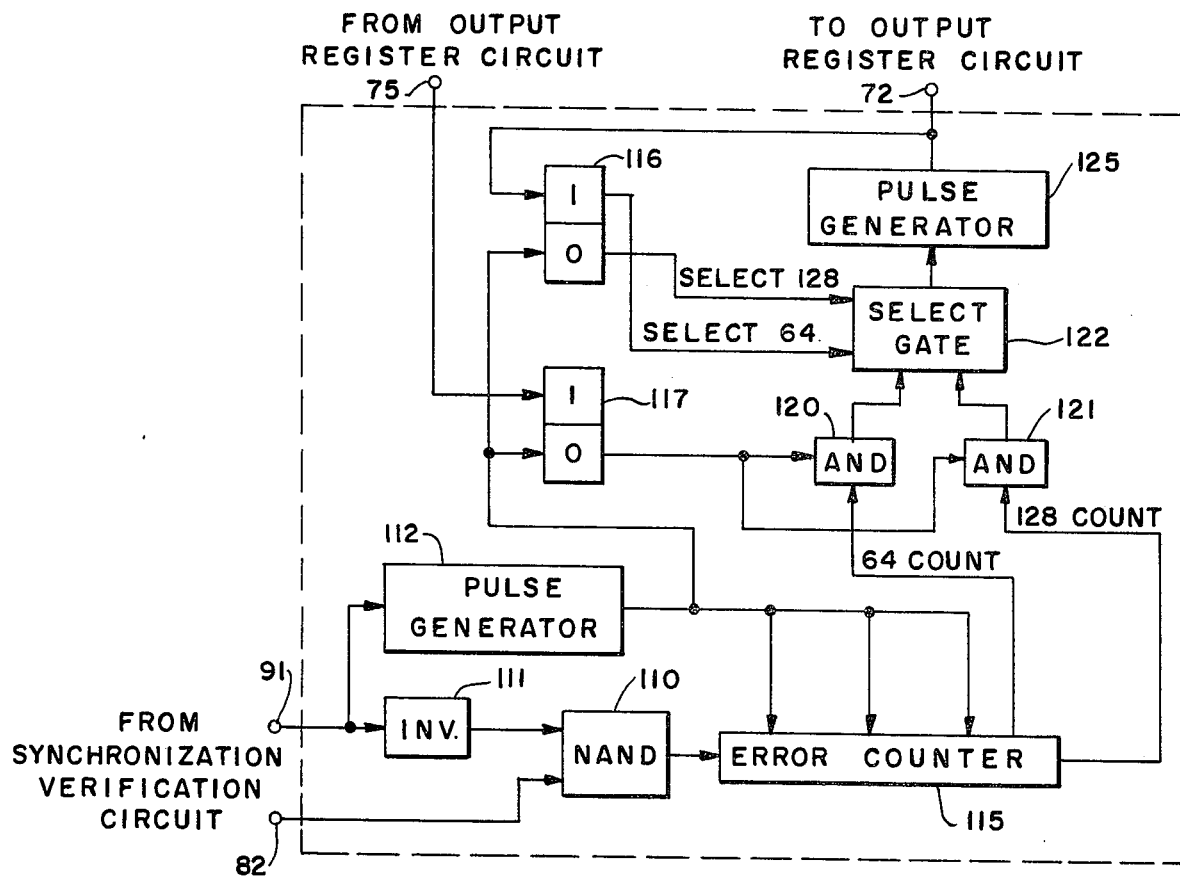
FIG. 6 is a search control circuit included within the present invention.

Referring to FIG. 6, clock pulses from the synchronization verification circuit (FIG. 5) are applied via terminal 82 to "NAND" gate 110 (A NAND gate has its output equal logic 1 only when all inputs are logic 0). Information from the synchronization verification circuit is applied at terminal 91 to an inverter 111 and a pulse generator 112. The output of the inverter 111 is applied to NAND gate 110, which in turn is connected to an error counter 115. The pulse generator 112 is connected to the error counter 115 and to the 0 reset input of flip-flops 116 and 117. Information from the output register circuit (FIG. 4) is applied to the terminal 75 which is connected to the 1 reset input of flip-flop 117. This flip-flop is connected to AND gates 120 and 121, as is the error counter 115. The AND gates 120 and 121 are connected to a select gate 122, as are the 1 and 0 outputs of the flip-flop 116. The select gate 122 is connected to a pulse generator 125 which is connected to the 1 reset input of flip-flop 116 and to the terminal 72 which is connected to the output register circuit.

In operation, the search control circuit is passive as long as the synchronization pattern from the transmitter is being received and verified. Once sync is lost, a logic 1 is placed in the pattern store circuit 90 (FIG. 5) causing a logic 1 to appear at terminal 91. The logic 1 at terminal 91 is inverted by inverter 111 and the resulting logic 0 opens NAND gate 110. Clock pulses applied at terminal 82 pass through NAND gate 110, thereby incrementing error counter 115. In this preferred embodiment, loss of sync is not presumed until the error counter has reached some value, for example, a count of 128. Upon reaching the value of 128, the error counter 115 supplies a logic 1 pulse to the AND gate 121 which has been enabled by the flip-flop 117. The "select 128" input of select gate 122, which was enabled by the setting of the 0 output of flip-flop 116, allows the logic 1 to pass from AND gate 121 through the select gate 122 to pulse generator 125. The resulting pulse resets the 1 output of flip-flop 116, and passes, via terminal 72, to the output register circuit. Thereafter, so long as the search control circuit is operative, the "select 64" input of select gate 122 is enabled, thereby allowing each "64 count" pulse from the error counter 115 to pass through the AND gate 120 and the select gate 122 to the pulse generator 125. As previously explained hereinabove, each pulse from pulse generator 125 appearing at terminal 72 steps the address counter 70 (FIG. 4) to increase or decrease the transmission path delay. After each such step the synchronization verification test is made to determine whether sync has been regained. Once sync has been verified, the resulting logic 0 applied to terminal 91 activates pulse generator 112, thereby causing flip-flop 116 and 117 to reset to logic 1 and resetting the error counter 115 to zero.

The described apparatus provides an automatic and rapid means for initially establishing synchronization, monitoring any loss of synchronization, and searching for and regaining synchronization without altering the total transmission time delay.

It is to be understood that the description hereinabove is of a preferred embodiment, and that the inventer intends that his rights be measured only in accordance with the appended claims.

What I claim is:
1. A communication system comprising:
   means for transmitting a multi-channel time division multiplex signal, wherein said means includes a source for the generation of a synchronization pattern for transmission on one channel of said signal;
   a receiver geographically separated from the transmitter;
   a signal path connecting said transmitter means and said receiver, the transmission delay over said path being variable with respect to time;
   a local pattern generator adjacent to the receiver, which generates a pattern identical to the received pattern;

means for detecting a loss of synchronization by comparing the received pattern and said local pattern to detect a loss of alignment thereof, and means adjacent to said receiver and within said signal path, and responsive to said detecting means, for maintaining constant the transmission time delay between said transmitter means and said receiver by predictably adding and subtracting increments of delay to realign said received pattern with said locally generated pattern.

2. The apparatus of claim 1 wherein said detecting means includes means for detecting a predetermined number of mismatches between the received pattern and the locally generated pattern.

3. The apparatus of claim 1 wherein said delay maintaining means includes a shift register into which said received pattern is shifted and means to predictably add and subtract delay stages from said register.

* * * * *